United States Patent [19]
van Breemen et al.

[11] Patent Number: 5,473,696
[45] Date of Patent: Dec. 5, 1995

[54] METHOD AND APPARATUS FOR COMBINED ENCRYPTION AND SCRAMBLING OF INFORMATION ON A SHARED MEDIUM NETWORK

[75] Inventors: John H. M. van Breemen, Amsterdam; Robert J. M. Verbeek, Hoevelaken, both of Netherlands

[73] Assignee: AT&T Corp., Murray Hill, N.J.

[21] Appl. No.: 148,752

[22] Filed: Nov. 5, 1993

[51] Int. Cl.⁶ ........................................... H04L 9/00
[52] U.S. Cl. ........................ 380/49; 380/9; 380/46
[58] Field of Search ............................. 380/9, 21, 28, 380/33, 43, 44, 46, 49, 50

[56] References Cited

FOREIGN PATENT DOCUMENTS

| 0090771 | 10/1983 | European Pat. Off. | 380/44 |
|---|---|---|---|
| 2507844 | 12/1982 | France | 380/46 |

OTHER PUBLICATIONS

J. Svigals, "Dynamic Communication Key Accumulated from Previous Message Content"; *IBM Tech. Discl. Bull.*, (vol. 25, No. 1, Jun. 1982; p. 279).

H. H. Grotjohann, F. Jaegar and P. G. Schaafsma, Dutch FTTH on Trial, Communications International, pp. 49–56 (Jan. 1992).

CCITT Recommendation I. 361, B–ISDN ATM Layer Specification, Study Group XVIII, Report R–116, §2, pp. 2–16 (Jul. 1992).

CCITT Recommendation I. 432, B–ISDN User Network Interface—Physical Layer Specification, Study Group XVIII, Report R–119, §§ 4.3, 4.5 pp. 157–199 (1992).

*Primary Examiner*—Bernarr E. Gregory
*Attorney, Agent, or Firm*—Robert E. Rudnick

[57] ABSTRACT

An improved method and apparatus for encrypting and scrambling information cells transmitted on a telephone system local loop from a central office to a plurality of user premises networks via a shared medium passive optical network. Prior to transmission, the information cell is encrypted for security purposes and scrambled to improve its transmission properties by modulo 2 addition of the information cell and a combined encryption and scrambling sum pattern. At the other end of the passive optical network which is connected to user premises networks, the received encrypted and scrambled information cells are used to generate a processed cell by the modulo 2 addition of the received cell and a combined decryption and descramble sum pattern.

32 Claims, 8 Drawing Sheets

FIG. 1

PRIOR ART

FIG. 2

PRIOR ART

METHOD AND APPARATUS FOR COMBINED ENCRYPTION AND SCRAMBLING OF INFORMATION ON A SHARED MEDIUM NETWORK

FIELD OF THE INVENTION

The present invention pertains to cryptographic communications in general, and more particularly to a combination of a set-reset scrambler and a set-reset encryptor in a communications system.

BACKGROUND OF THE INVENTION

Optical transmission systems have enjoyed increasing usage throughout telephone network and switching systems. For example, optical fiber systems have replaced copper based transmission systems in many trunk and junction networks. As optical fiber systems become more pervasive in the user area of the telecommunication system, better and less expensive usage of the capabilities of optical fiber transmission systems will be in demand.

Within the user area, a contemplated application of optical transmission systems is for connection to a broadband integrated services digital network ("ISDN") for providing interactive services including the distribution of video signals in the local loop. The optical transmission system configuration envisioned for such a connection network is a shared medium passive optical network ("PON") having a tree-and-branch topology. This topology provides a cost-effective way to connect small businesses and residential subscribers to an ISDN, and has been used in several field trials for Plain Old Telephony Services and distributive services, such as the Amsterdam-Sloten Fibre to the Home Field which is described in H. H. Grotjohann, F. Jaeger and P. E. Schaafsma, *Dutch FTTH on Trial*, Communications International, p. 49 (January 1992).

In a PON, the optical fiber is shared by a group of customers. Further, in a passive optical network having a tree-and-branch topology, a single fiber emanates from a local exchange and fans out via passive optical splitters and tree couplers to a plurality of service customers.

One method for transmitting information from the local exchange to individual customers using such a topology is as follows. Information is transmitted in packets or cells. Each transmitted cell contains a routing address identifying the intended destination customer. All information cells are transmitted through the entire PON to optical receivers located at the ends of the network which are called optical network terminations ("NT"). Each NT is connected to a corresponding group of customers. When an NT receives an information cell, it compares its address with the routing address contained within the cell. When the addresses match, the information is delivered to the customer. When a match is not detected, the NT discards the received information and no transmission is made to any associated customers.

A potential problem of eavesdropping exists in such a network because an unscrupulous customer would have access to all the information transmitted by the local exchange if he were to tap into his NT. Several measures have been implemented to add some level of security and privacy to shared medium systems. Some of these measures include various forms of encrypting the transmitted information. In such systems, it is intended that only the destination NT be able to decrypt the information cell and deliver the decrypted original information to the intended subscriber.

One conventional method of encryption is to combine a pseudo-random stream of binary bits to the information cell to be transmitted using modulo 2 addition. Generation of the pseudo-random sequence can be accomplished by dedicated hardware, such as feedback shift registers, or in software. Deciphering the encrypted information stream occurs by combining, using modulo 2 addition, the encrypted information stream with the identical pseudo-random sequence used for encryption.

In addition to encryption for security purposes, it is also desirable to scramble or rearrange the bits of the information stream to avoid transmitting periods of DC signals which occurs when continuous sequences of either logic ones or zeros are transmitted. Scrambling is performed on a transmitted signal, in order to increase the number of 0-to-1 transitions, thereby minimizing the DC content. DC signals interfere with clock recovery in the network termination. Clock recovery is the generation of a local clock signal that is derived from the received information to permit synchronous, in phase, reading of the transmitted information.

In conventional information transmission systems, the operations of encryption and scrambling have been performed by separate hardware. Likewise, the operations of descrambling and decryption have also been performed using separate hardware.

A reduction in hardware for the operations of scrambling and encryption would result in a less complex system and a cost savings for each of the local exchanges. Likewise, a reduction in the hardware for the operations of descrambling and decryption would result in a similar reduction in complexity and cost savings in each of the NTs. However, a cost reduction in the NTs results in a substantial savings because of the very large number of NTs employed.

SUMMARY OF THE INVENTION

The invention provides a method and apparatus which combines the functions of a set-reset encoder and a set-reset scrambler for the transmission of information packets in a shared medium communication system, such as a PON. The invention generates a pseudo-random sum pattern by combining a pseudo-random encryption pattern and a scramble pattern using modulo 2 addition. The pseudo-random sum pattern is then stored in memory. A particular pseudo-random sum pattern exists for each one of the NTs in the PON. The particular encryption key used to generate a particular pseudo-random sum pattern is related to the corresponding address of a destination customer. The scrambling pattern is produced independent of the destination address.

The creation and storing of the pseudo-random sum pattern is performed offline. At the appropriate time, when the corresponding data cell is to be transmitted, the pseudo-random sum pattern is combined with the cell using modulo 2 addition to produce an encrypted and scrambled data cell. The encrypted and scrambled data cell also contains unencrypted routing information. The encrypted and scrambled cell is transmitted on a shared medium network in an information stream comprising a continuous sequence of data cells transmitted to various customers.

An advantage of this combination method is the elimination of the separate scrambler circuit resulting in a reduction of system complexity and required hardware. Further, because the pseudo-random sum pattern is generated in software like the pseudo-random pattern, the complexity of the encryption routine does not appreciably increase. Another advantage of the invention is that the software generated encryption pattern and scrambling pattern may easily be changed. Yet another advantage of this encryption and scrambling system is that it permits decryption and descrambling of the cell at the network termination to be performed in a conventional manner.

A corresponding system for descrambling and decryption according to the present invention can be implemented at the NTs to realize a similar reduction in hardware. In an NT according to the present invention, a descramble and decryption sum pattern is generated and stored in memory offline. The sum pattern is generated by combining a descramble pattern and a decryption pattern using modulo 2 addition. As the NT sequentially extracts data cells from the information stream, the sum pattern is added to the extracted encrypted and scrambled cells. The unencrypted address information is read and if the particular NT is the intended destination for that cell, the unscrambled and decrypted information is passed to the destination customer.

Because the encryption of each data cell is based on the destination address, only the appropriate destination NT for that address will be able to properly decipher the cell information. Although the other NTs will attempt to decipher the cell by adding their descrambling and decryption patterns to that cell, no decryption will occur because those patterns will not be based on the proper decryption key. Therefore, security and privacy of the information will be maintained.

DETAILED DESCRIPTION

Figure 1:
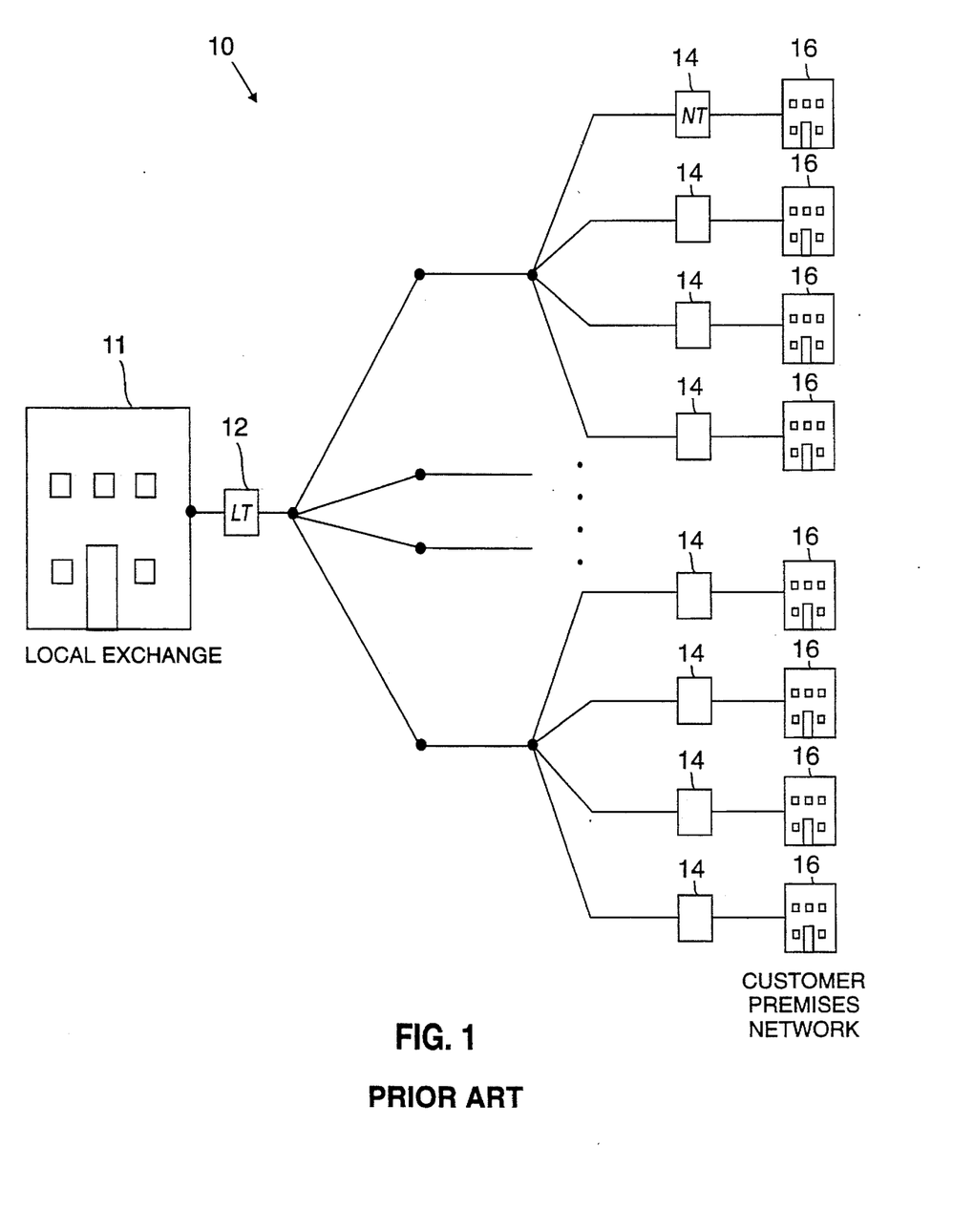
FIG. 1 illustrates a prior art telecommunication system local loop having a passive optical network with the preferred tree-and-branch topology.

A PON 10 with a tree-and-branch topology is shown in FIG. 1. In one embodiment of the present invention, it is envisioned that a network, such as the network 10 will be utilized for the transportation of asynchronous transfer mode ("ATM") information cells. In the network of FIG. 1, the information transmitted on the PON 10 is controlled at a local exchange 11 and broadband line termination ("LT") 12. At the other side of the network 10 there are a number of optical receivers, such as network terminations ("NT") 14. Each NT 14, in turn, is connected to a customer premises network 16.

Information is transmitted downstream from local exchange 11 through LT 12 to each of the NTs 14 and ultimately to the customer premises networks 16. The downstream traffic consists of an information stream comprising a continuous flow of ATM cells of the form shown in FIG. 2. The entire information stream is transmitted to all of the NTs 14. Each NT 14 sequentially extracts and processes the ATM cells from the stream and identifies those cells for which it is the intended destination. It then routes those cells identified as intended for that destination to its associated customer network 16.

Figure 2:
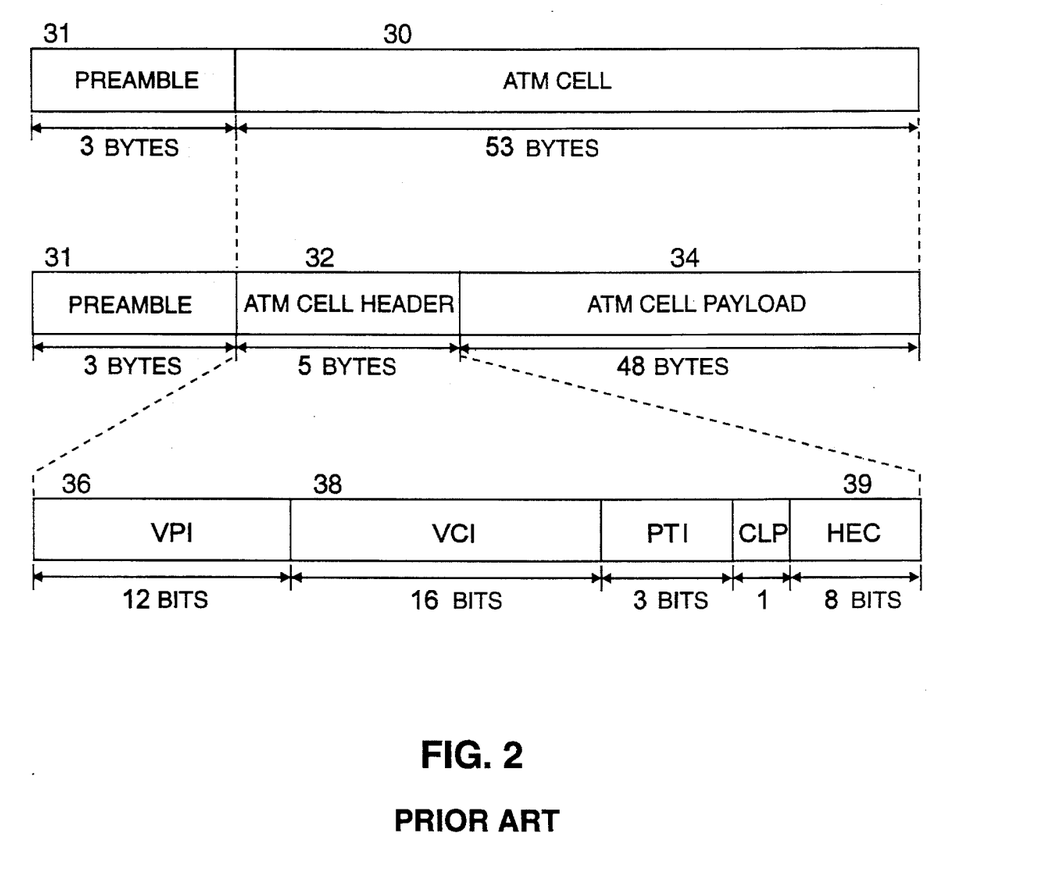
FIG. 2 illustrates a prior art format for an asynchronous transfer mode cell with preamble that is transmitted on the network of FIG. 1.

One fixed length data format used for the transmitted ATM cells is shown in FIG. 2. Asynchronous transfer mode or ATM is a technique for multiplexing and switching within a network for the transfer of data. A more detailed description of a standard ATM cell format is described in CCITT Recommendations 1.361, *B-ISDN ATM Layer Specification*, Study Group XVIII, Report R-116, §2, pp. 2–9 (July 1992).

Referring to the data format of FIG. 2, an ATM cell 30 has a fixed length of 53 bytes which comprises: an ATM cell header 32 with five bytes, and an ATM cell payload 34 with 48 bytes. The header 32 contains the routing information of the cell, a Cyclic Redundancy Check ("CRC") for bit error detection, and correction data, called Header Error Control ("HEC") 39. The payload 34 contains user information, signalling information or operation and maintenance ("OAM") information.

The routing information is subdivided into Virtual Paths ("VP") and Virtual Channels ("VC"). The header 32 consists of a 12 bit VP field 36 and a 16 bit VC field 38. The content of the VP field is called Virtual Path Identifier ("VPI") and the content of the VC field is called Virtual Channel Identifier ("VCI"). The network 10 uses the virtual paths to route cells from the LT 12 to the NTs 14. Up to 32 NTs 14 are envisioned to be used within each network 10. Because there are up to 32 NTs 14, five bits are sufficient to describe each of the NT 14 addresses. Therefore, the first five bits of the twelve bit VP field 36 denote a particular NT 14 address to which the cell is destined.

When the ATM cell 30 is transmitted on PON 10 in the downstream direction, it is preceded by a three byte preamble 31 containing control information. The operations controlled by the preamble 31 are unrelated to scrambling and encryption and include such functions as laser control and upstream traffic control. However, an alternative location for the ATM cell routing information may be in the preamble 31.

Figure 3:
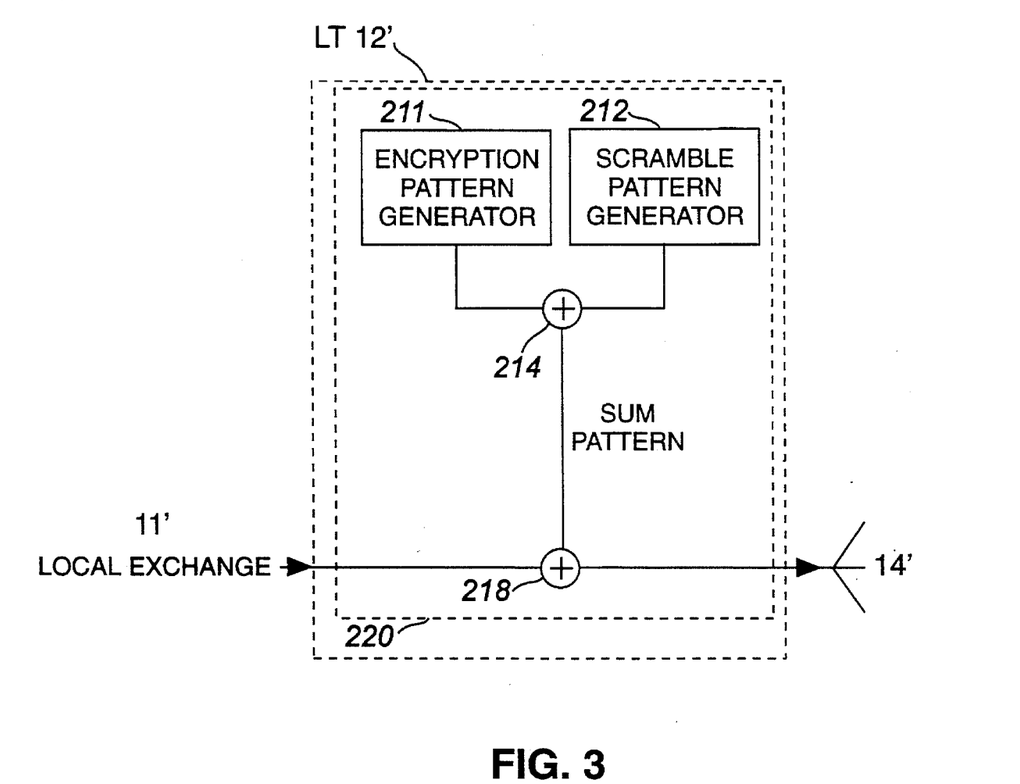
FIG. 3 is a schematic diagram illustrating the operation of a line termination circuit according to the present invention.

FIG. 3 is a schematic representation of an LT transmitter 12' utilizing a combined encryption and scrambling circuit 220 according to-the present invention. The combined encryption and scrambling circuit 220 eliminates the need for separate hardware to perform the operations of encryption and scrambling in the prior art LT 12 of FIG. 1. In the LT 12' of FIG. 3, each ATM information cell is passed through the encryption and scrambling circuit 220 before it is transmitted to NTs 14', such as the NTs 14 of FIG. 1. The combined encryption and scrambling circuit 220 includes an encryption pattern generator 211 and scramble pattern generator 212 connected to a first modulo 2 adder 214. Modulo 2 adder 214 is connected to one input of a second modulo 2 adder 218. The other input of the modulo 2 adder 218 is connected to a local exchange 11', such as the local exchange 11 of FIG. 1, and is adapted to receive the ATM information cells that are to be transmitted.

In operation, the encryption and scrambler patterns generated by blocks 211 and 212, respectively, are combined by modulo 2 adder 214 to form a pseudo-random sum pattern. The generated pseudo-random sum pattern is then combined with the ATM information cell by modulo 2 adder 218. The resulting encrypted and scrambled ATM cell is transmitted to NTs 14'. A suitable scrambling technique that may be used by the scramble pattern generator 212 is set out in CCITT Recommendation 1.432, *B-ISDN User Network Interface-Physical Layer Specification,* Study Group XVIII, Report R119, §4.5, pp. 180–187 (1992).

The encryption key used to generate the encryption pattern in block 211 is the same key used in the destination NT 14' to generate the decryption pattern. A different key is associated with each NT. In order to improve the security and privacy performance, these keys may function so that they change in time. The scramble pattern is not dependent on or related to the address of the intended destination.

The routines used in the encryption pattern generator 211 and scramble pattern generator 212 are reset before processing each ATM cell and thereby are considered to be of the set-reset type. These set-reset circuits operate on each ATM cell, individually, as opposed to the information stream as a whole. The advantage of using set-reset encryption and scrambling is the avoidance of error multiplication occurring throughout the information stream which obviates the need for complex scrambler phase detection circuits in each of the NTs 14'. More specifically, if encryption and scrambling were performed on the entire information stream as a whole, any errors generated in the processing of one cell may propagate and multiply in the processing of subsequent cells. Set-reset encryption and scrambling of individual ATM cells using pseudo-random sum sequences eliminates the possibility for error multiplication.

An advantage of the present invention in FIG. 3 is the elimination of a separate circuit to perform scrambling of the ATM cell. In addition, the hardware and software needed to generate the encryption and scramble sum patterns are of similar complexity to the conventional encryption pattern generator in LT 12 of FIG. 1.

The destination address fields of each ATM information cell 30 transmitted by LT 12' of FIG. 3 is not encrypted or scrambled to facilitate cell processing in the NTs 14'. If the traffic behavior on the network is considered significantly secret, the fields containing the address information may be encrypted. As stated above, the destination address information may be located in the preamble VPI field 36 and/or VCI field 38 of the ATM cell header 32 or in the preamble as shown in FIG. 2. Corruption of the ATM cell header 32 may occur when other portions of the ATM cell 30 are encrypted. Corruption of header 32 may cause the NTs 14 to perform cell extraction, descrambling and decryption out of synchronization. There are several methods to insure that the header portions 32 of the transmitted ATM cells are uncorrupted and valid using the HEC field 39.

One method to ensure validity of the ATM cell header 32 is to encrypt only the bits of the ATM cell payload 34 and not those in the ATM cell header 32. Another method is to recalculate the bits of the HEC field 39 after encryption has occurred and insert them into the encrypted ATM cell 30. Yet another method is to select encryption patterns that do not affect the validity of the HEC field 39. This method requires a careful selection of encryption patterns and results in a limitation of the number of patterns that may be used. In addition, it may be preferable not to encrypt the preamble because the process of decryption delays the availability of that data and the availability of the control information of the preamble 31 may be time critical.

Figure 4:
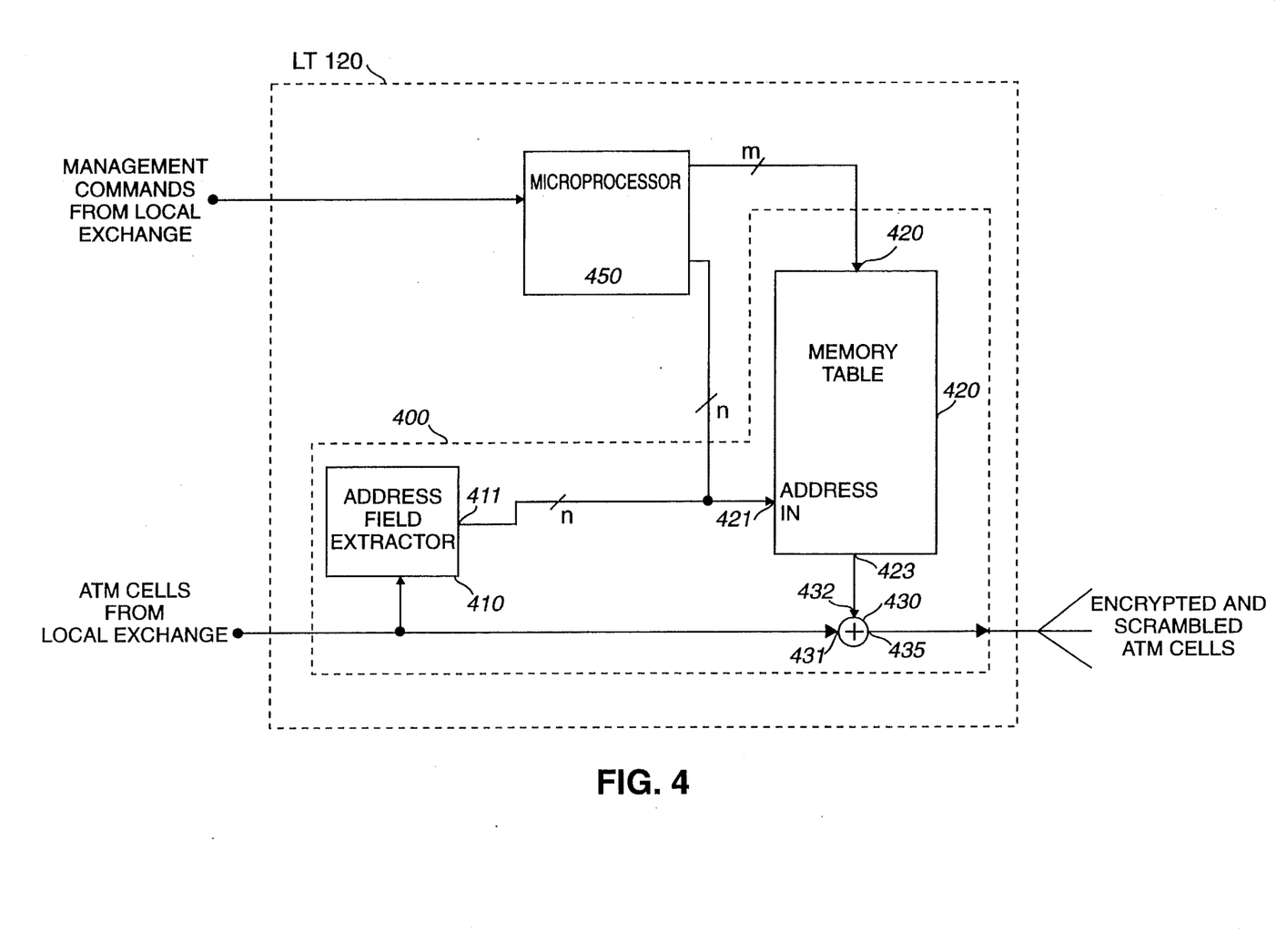
FIG. 4 is a schematic diagram of an alternative embodiment of a line termination according to the present inventions.

In a preferred embodiment, shown in FIG. 4, the scramble and encryption patterns are generated and combined by a microprocessor 450 in advance, offline, to form the combined encryption and scramble sum pattern which is stored in a memory device 420. In an LT 120 of FIG. 4, each ATM information cell received from a local exchange, such as the local exchange 11 of FIG. 1, is passed through the combined encryption and scramble circuit 400 before it is transmitted to NTs, such as NTs 14 of FIG. 1. In the combined encryption and scramble circuit 400, the address fields of the ATM cell is read by an address field extractor circuit 410. The address field extractor circuit 410 has an n-bit wide output 411 connected to an address input 421 of a combined encryption and scramble pattern memory table 420.

Memory table 420 contains encryption patterns which were combined with a scramble pattern using modulo 2 addition. Each memory address location within memory 420 corresponds to a routing address for each particular NT in the network. The data contents of each of these memory locations is the combined encryption and scramble sum pattern for the corresponding particular NT.

An output 423 of memory table 420 is connected to an input 432 of a modulo 2 adder 430. A second input 431 of modulo 2 adder 430 receives the ATM cells. The encrypted and scrambled ATM cells which are to be transmitted on the network are generated at an output 435 of the modulo adder 430.

The microprocessor 450 contained in LT 120 receives management signals from the associated local exchange to manage operations unrelated to the present invention. The microprocessor 450 is also responsible for the generation of new combined encryption and scramble sum patterns for use with the NTs 140. For this purpose microprocessor 450 is connected to the data input 425 and address input 421 of memory table 420.

Figure 5:
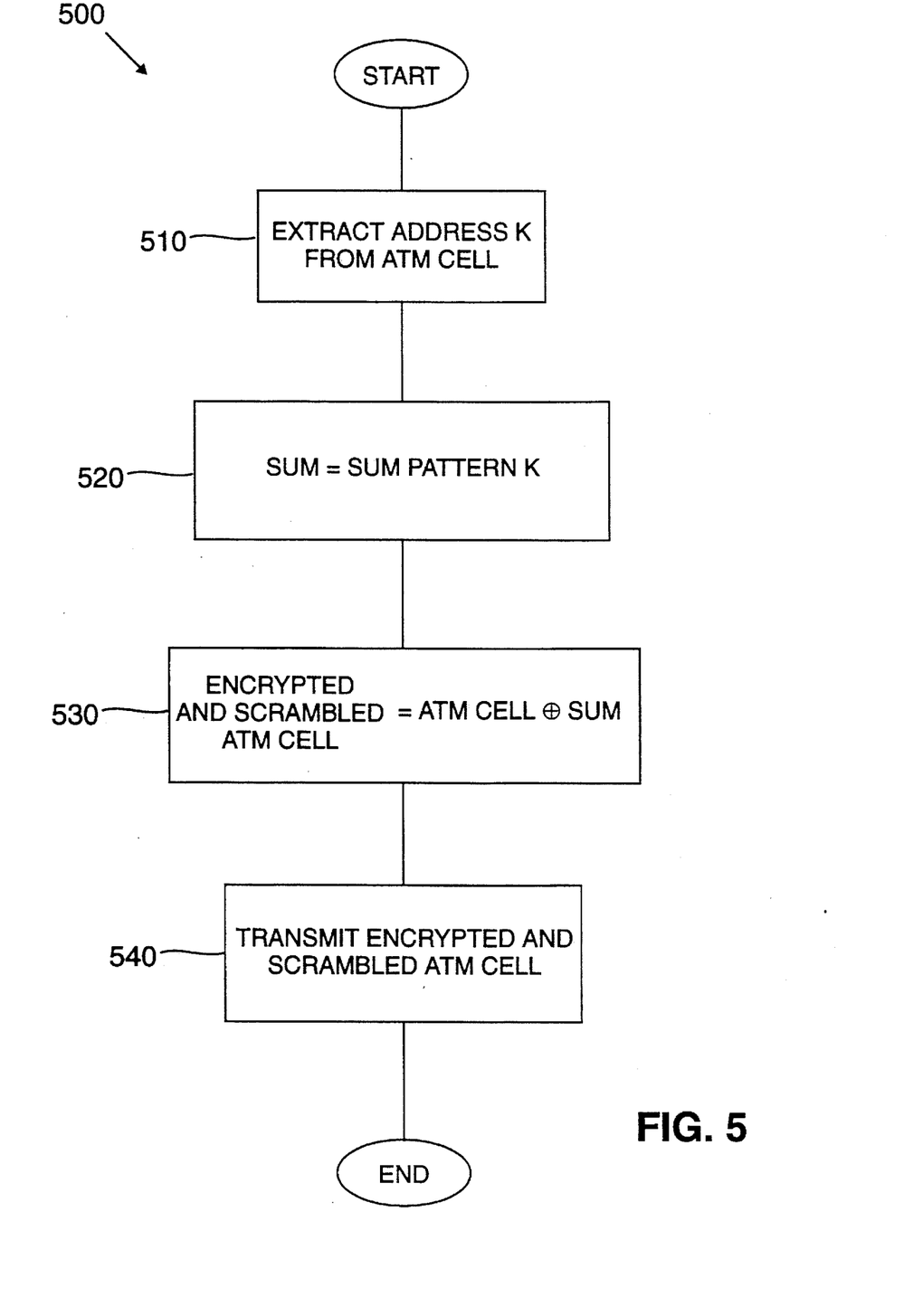
FIG. 5 is a flow diagram of the operations of the circuit in FIG. 5 according to the present invention.

The operation of encrypting and scrambling of ATM cells by LT 120 will now be described with reference to flow diagram 500 of FIG. 5 and the circuit 120 of FIG. 4. The routing address information K is read from an ATM cell received from the associated local exchange for transmission as shown in step 510. This step occurs in the address extractor circuit 410. In step 520, the extracted routing address K is then used as an address pointer to memory table 420 to obtain the proper combined encryption and scramble sum pattern SUM. The pattern SUM will be placed on the data output 423 of memory table 420.

The proper combined encryption and scrambling pattern SUM read from memory 420 is combined with the ATM cell by modulo 2 adder 430 to form the encrypted and scrambled ATM cell. This operation is shown in step 530. Lastly, the encrypted and scrambled ATM cell is transmitted on the network which is shown in step 540. The sequence of operations shown in FIG. 4 is repeated for each ATM cell to be transmitted.

The LT 120 generates the necessary valid HEC field 39, without the requirement of additional circuitry or special software as is required in prior art techniques. The present invention takes advantage of the fact that the CRC operation used to generate the proper HEC field 39 is a linear operation as set out in CCITT Recommendation 1,432, *B-ISDN User Network Interface-Physical Layer,* Study Group XVIII, Report R119, §4.3, pp. 176– 180 (1992). The proper HEC field for the encrypted and scrambled cell is generated by modulo 2 addition of the valid HEC field of the original ATM cell and the valid HEC field generated for the combined encryption and scramble sum pattern. Therefore, the combined encryption and scramble sum pattern should be stored in the memory table 420 with a valid HEC field.

Figure 6:
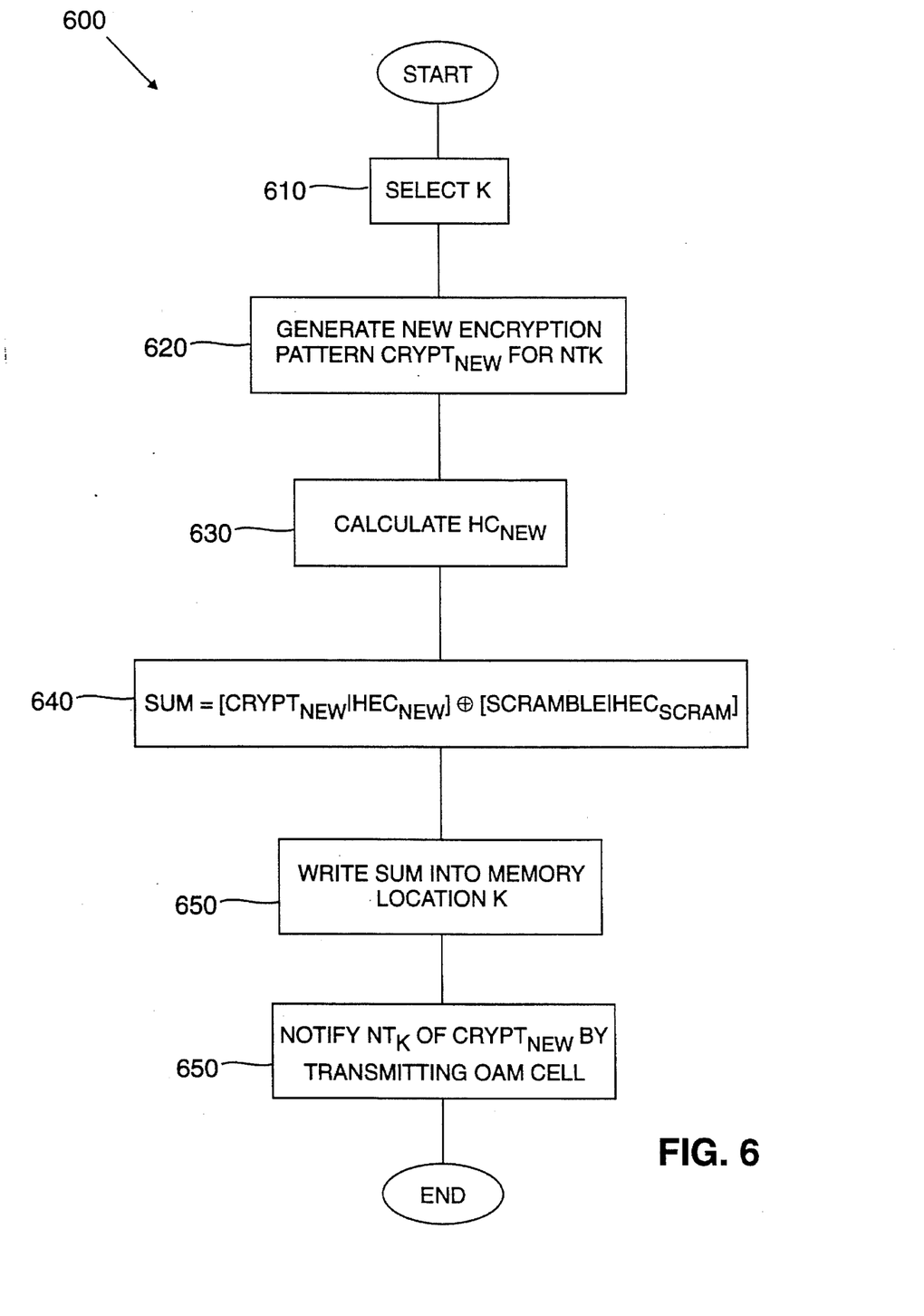
FIG. 6 is a flow diagram of a routine which may be used by the processing unit in FIG. 5 to generate new combined encryption and scramble sum patterns according to the present invention.

FIG. 6 illustrates one method of generating and storing the combined encryption and scramble sum patterns for each one of the NTs in the network by the microprocessor 450 of FIG. 4. Referring to FIG. 6, the first step of flow diagram 600 is to select which NT address, K, the new combined encryption and scramble pattern is to be generated. A new encryption pattern $crypt_{new}$ is generated in step 620 and a corresponding new HEC field $HEC_{new}$ is generated in step 630. In step 640, a new combined encryption and scramble sum pattern with valid HEC field is formed by modulo 2 addition of the new encryption pattern, $crypt_{new}$, with its valid HEC field, $HEC_{new}$, and a scramble pattern with its valid HEC field, $HEC_{scram}$. The scramble pattern used in the microprocessor is the same for all NT addresses. Further, the microprocessor 450 may also determine whether the generated pseudo-random sum pattern would produce an invalid sequence or inefficient transmission of a corresponding encrypted and summed information cell. An example of an invalid sequence is one that would be erroneously interpreted by the network as a system management command and not a portion of a transmitted information cell.

In step 650, the new combined encryption and scramble sum pattern is stored at the proper memory location in memory device 420. Lastly, the LT 120 transmits an ATM cell with an OAM payload to the particular NT having routing address K to notify it of the new encryption pattern to be used on encrypted ATM cells it will be processing.

Figure 7:
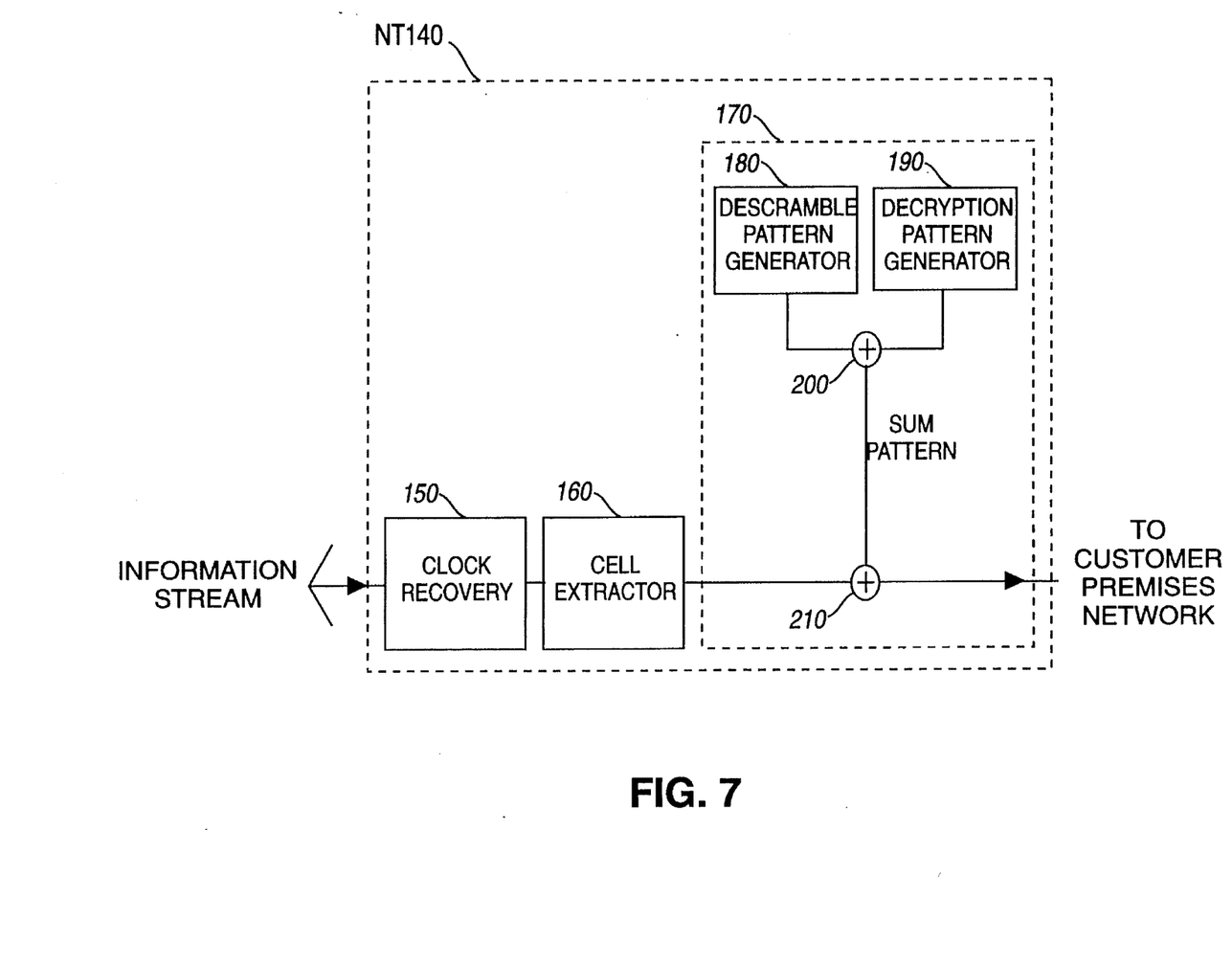
FIG. 7 is a schematic diagram illustrating a network termination circuit of a telecommunication system according to the present invention.

A still further contemplated embodiment of the present invention results in a reduction of hardware in the conventional NTs 14 of FIG. 1. FIG. 7 depicts an NT 140 according to the present invention which eliminates the need for separate hardware to perform the operations of descrambling and decryption in the conventional NT 14. Referring to the NT 140 of FIG. 7, clock recovery circuit 150 receives the information stream from the network. Cell extractor 160 is connected to the output of clock recovery circuit 150 and to a descrambling and decryption circuit 170.

Within the decryption and descrambling circuit 170, a descramble pattern generator 180 and a decryption pattern generator 190 are connected to a first modulo 2 adder 200. The output of first modulo 2 adder 200 is connected to an input of a second modulo 2 adder 210. A second input of the modulo 2 adder 210 is connected to the cell extractor 160. The output of modulo 2 adder 210 is connected to a user premises network, such as the customer premises networks 16 of FIG. 1.

In operation, the clock recovery circuit 150 produces a local clock signal to assist in the synchronous reading of data from the information stream. The clock recovery circuit 150 does not alter the received information stream. The best performance for the clock recovery circuit 150' is achieved when the whole information stream, including the preamble, header and payload for each ATM cell is scrambled. However, because set-reset encryption and scrambling techniques are used, the ATM cell header 32 is not scrambled. Nevertheless, the performance improvement achieved in clock recovery due to the scrambling of the majority of the information stream is minimally effected by the relatively small portions of unscrambled ATM cell headers 32.

The unaltered information stream at the output of the clock recovery circuit 150 is passed through the cell extractor 160 which sequentially extracts the ATM information cells from the information stream. Since the ATM cell address field is not scrambled, the cell extraction circuit 160 can easily detect the beginning and end of each ATM cell in the information stream. Techniques suitable for use in the clock recovery circuit 150 and the cell extractor 160 are described in the CCITT Recommendations I.432, *B-ISDN User Network Interface-Physical Layer Specification,* Study Group XVIII, Report R119, §4.5, pp. 180– 186 (1992).

Referring to the descrambling and decryption circuit 170 of FIG. 7, the necessary descramble and decryption patterns are generated by the descramble pattern generator 180 and decryption pattern generator 190, respectively. The decryption and descramble patterns are combined by modulo 2 adder 200 to generate an decryption and descrambling sum pattern. The modulo 2 adder 210 combines the sum pattern with each of the extracted ATM cells to produce processed ATM cells.

If the NT 140 is the intended destination NT, determined by inspecting the ATM cell address information, the processed ATM cell represents the actual descrambled and decrypted original ATM information cell, and is transmitted to the associated user premises network. However, if the NT 140 is not the intended destination, the processed cell is discarded and is not transmitted to the user.

Since the encryption of each ATM information cell is based on the destination NT address, only one NT 140, the intended destination NT 140, will be able to properly decrypt the ATM cell. Although the other NTs 140 will add their decryption and descrambling sum patterns to the received ATM cell, no decryption will occur because the improper decryption key would have been utilized. Therefore, the security of the information would be maintained.

Figure 8:
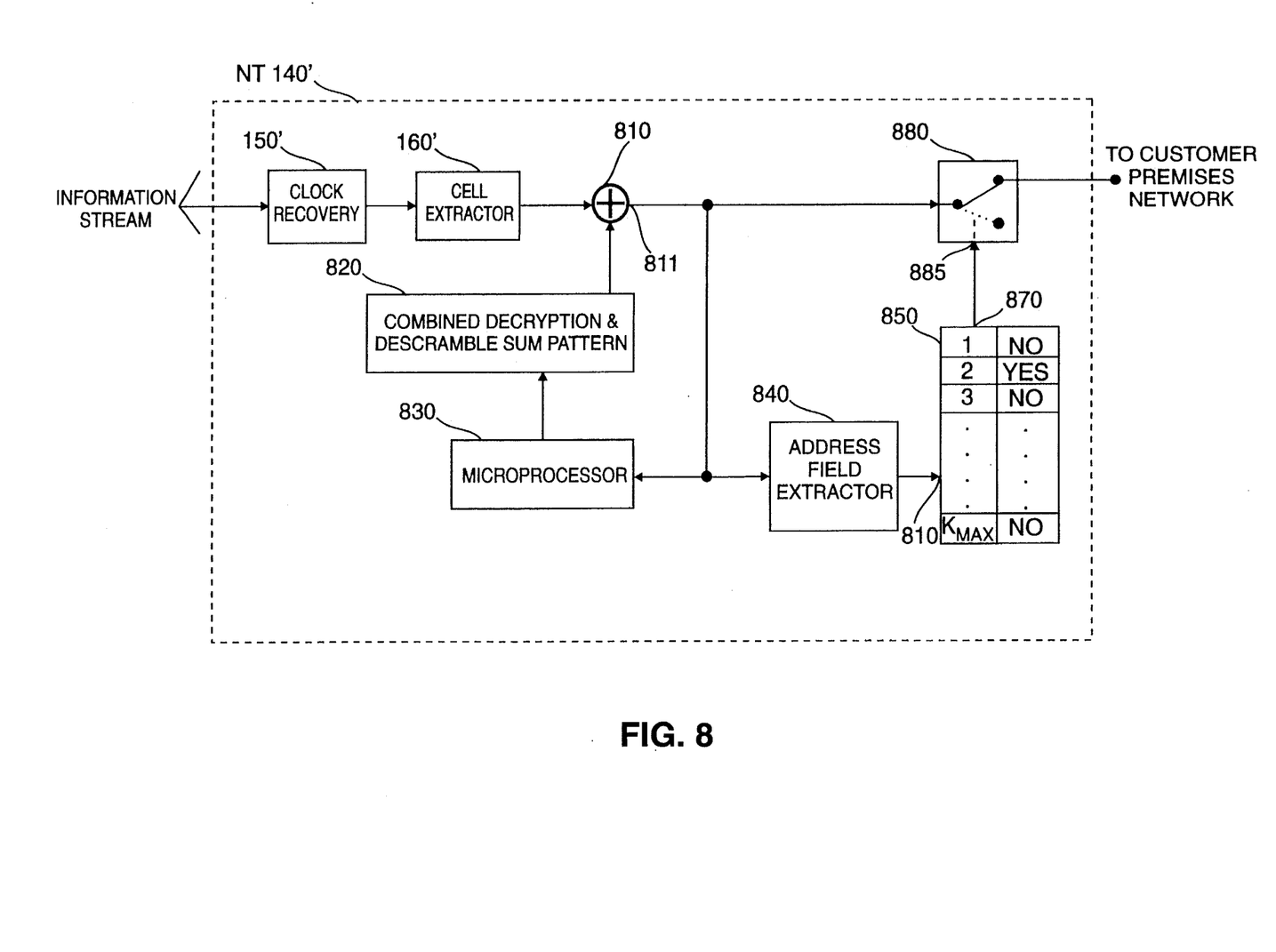
FIG. 8 is a schematic diagram illustrating an alternative embodiment of a network termination according to the present invention.

FIG. 8 depicts NT 140', an alternative embodiment of the present invention. In FIG. 8, the information stream from the network is received by a clock recovery circuit 150'. The clock recovery circuit 150' is connected to the cell extractor 160' which sequentially extracts the encrypted and scrambled ATM cells from the information stream.

A modulo 2 adder 810 combines each extracted ATM cell with a combined decryption and descramble sum pattern stored in memory device 820 to form a processed cell at its output 811. The output 811 is connected to a microprocessor 830 which is connected to the memory device 820. The adder output 811 is also connected to an address field extractor 840. The address field extractor 840 is connected to an address input 810 of memory table 850. The memory table 850 has an output 870 connected to a control terminal 885 of a controllable switch 880. The controllable switch 880 is connected to the output 811 of modulo 2 adder 810, and to an associated user premises network, such as the user premises network 16 of FIG. 1.

In operation, the clock recovery circuit 150' and cell extractor circuit 160' may function in the manner as shown by circuits 150 and 160 in FIG. 7. Each encrypted and scrambled ATM cell extracted by circuit 160' is added with a combined decryption and descramble sum pattern stored in memory device 820 by modulo 2 addition.

The combined decryption and descramble sum pattern stored in memory device 820 is formed in the microprocessor 830 by modulo 2 addition of a descramble pattern and the identical pseudo-random encryption sequence used to encrypt cells destined for that particular NT 140'. The microprocessor 830 also reads the output of adder 810 to detect for the presence of OAM cells indicating that a new decryption pattern is to be generated and used.

After the processed cells are generated by adder 810, their routing address fields are read by address field extractor 840. The extracted address information is used as a pointer to the memory table 850 containing commands "yes" or "no". These commands indicate whether or not the processed cell is to be delivered to the user. A "yes" command will permit the processed cell to be delivered. A "yes" command is present only in a memory location address corresponding to the routing address of that particular NT 140'. A "no" command indicating that the processed cell should not be delivered is located in all memory locations corresponding to the addresses of the other NTs 140' in the network.

The "yes" or "no" output command instructs the controllable switch 880 to open or close the connection between output 811 of adder 810 and the associated customer premises network. The utilization of memory table 850 also facilitates the implementation of an NT 140' having more than one routing addresses In such an NT 140', a "yes" is stored in all locations of the memory table 870 corresponding to the addresses of that particular NT 140'. As an alternative embodiment of NT 140', the memory table 870 may be replaced by boolean gates configured to generate a "yes" command to switch 880 only for those addresses patterns corresponding to that particular NT's 140' address or addresses.

While the present invention has been described in terms of a conventional format for an ATM cell transferable on a shared medium passive optical network, it should be apparent that the present invention need not be limited to a passive optical system, but is applicable to other shared mediums where encryption and scrambling are performed, such as copper wire or wireless systems. In addition, the invention can also be implemented in other network topologies such as ring or bus configurations, or used with other types of information packet or packet cell formats, fixed length or otherwise.

We claim:

1. A method for transmitting an encrypted and scrambled information cell on a shared medium network having a transmitter and a plurality of receivers, each receiver having an address, wherein each transmitted information cell has a particular destination receiver which can properly decrypt and descramble the cell, the method comprising:

generating a pseudo-random sum pattern by modulo 2 addition of a scramble pattern and a pseudo-random encryption pattern;

generating the encrypted and scrambled information cell by combining the pseudo-random sum pattern with the information cell; and transmitting the encrypted and scrambled information cell on the network.

2. The method of claim 1, further comprising the steps of:

storing the pseudo-random sum pattern in a memory device, wherein the encrypted and scrambled information cell is generated by modulo 2 addition of the information cell and the contents of the memory device.

3. The method of claim 1, wherein the information cells are asynchronous transfer mode cells.

4. The method of claim 1, wherein each transmitted information cell contains address information regarding the address of the destination receiver.

5. The method of claim 4, wherein the address information of the information cell is not encrypted by the generated pseudo-random sum pattern.

6. The method of claim 1, wherein each encrypted and scrambled information cell is transmitted with a preamble.

7. The method of claim 6, wherein portions of the preamble are not encrypted.

8. The method of claim 6, wherein the address information regarding the destination receiver is contained within the preamble.

9. The method of claim 1, wherein the pseudo-random encryption pattern for the information cell is based on the address of the destination receiver.

10. The method of claim 1, further comprising:

identifying whether the generated pseudo-random sum pattern would produce an invalid sequence or inefficient transmission if combined with an information cell; and generating a new pseudo-random sum pattern if an invalid sequence or inefficient transmission would result.

11. A method for sequentially transmitting encrypted and scrambled information cells in a telecommunication system having a central office connected to a plurality of user premises networks via a shared medium network, the method comprising:

generating a pseudo-random encryption pattern for a corresponding information cell;

generating a scramble pattern;

generating a pseudo-random sum pattern by modulo 2 addition of the pseudo-random encryption pattern and the scramble pattern;

storing the pseudo-random sum pattern in a memory device;

generating the encrypted and scrambled information cell by modulo 2 addition of the contents of the memory device and the information cell; and transmitting the encrypted and scrambled information cell with a preamble on the shared medium network.

12. The method of claim 11, wherein each preamble or information cell contains address information concerning a destination customer for the cell.

13. The method of claim 12, wherein the address information is not encrypted.

14. A method of decrypting and descrambling information cells by a receiver in an telecommunication system, each information cell being encrypted and scrambled, the method comprising:

generating a descramble and decryption sum pattern by modulo 2 addition of a descramble pattern and a decryption pattern; and generating the descrambled and decrypted information cell by modulo 2 addition of the sum pattern and the received encrypted and scrambled cell.

15. The method of claim 14, further comprising:

storing the sum pattern in a memory device; and generating the decrypted and descrambled information cell by modulo 2 addition of the contents of the memory device and the received encrypted and scrambled cell.

16. The method of claim 15, wherein the generation of the descramble and decryption sum pattern and the storing of the sum pattern in the memory device are performed offline.

17. A method of decrypting and descrambling information cells by a receiver in a telecommunication system having a central office connected to a plurality of receivers, each information cell being encrypted and scrambled and containing address information concerning a particular destination receiver which can properly decrypt and descramble the cell, the method comprising:

generating a descramble and decryption sum pattern by modulo 2 addition of a descramble pattern and a decryption pattern;

storing the descramble and decryption sum pattern in a memory device;

comparing the address information of the cell and the receiver address; and generating the descrambled and decrypted cell by modulo 2 addition of the contents of the memory device and the received encrypted and scrambled cell if the address information matches.

18. The method of claim 17, wherein the generation of the descramble and decryption pattern, and storing of the pattern are performed offline.

19. A method of decrypting and descrambling information cells received by a receiver in an telecommunication system utilizing a shared medium network, the receiver having an address, each information cell being encrypted and scrambled, wherein each transmitted information cell has address information concerning a particular destination network termination which can properly decrypt and descramble the cell, the information cells being sequentially transmitted in a continuous information stream, the method comprising:

generating a descramble and decryption sum pattern by modulo 2 addition of a descramble pattern and a decryption pattern;

storing the descramble and decryption sum pattern in a memory device;

sequentially extracting the encrypted and scrambled information cells from the information stream; and generating a processed cell by modulo 2 addition of the contents of the memory device and the extracted encrypted and scrambled cell;

comparing the address information of the cell and the network termination address; and transferring the processed cell to the user premises network if the addresses match, wherein the processed cell is the decrypted and descrambled information cell when the addresses match.

20. An apparatus for transmitting an encrypted and scrambled information cell on a shared medium network comprising:

a pseudo-random encryption pattern generator;

a scramble pattern generator;

a first modulo 2 adder having an output and two inputs, the inputs being connected to the pseudo-random encryption pattern generator and to the scramble pattern generator, wherein the first adder produces a pseudo-random sum pattern at its output;

a second modulo 2 adder having an output and first and second inputs, the first input being connected to the output of the first adder and the second input for receiving an information cell that is to be transmitted, wherein the second adder produces the encrypted and scrambled information cell at its output; and a transmitter having and input connected to the output of the second adder and an output connected to the shared medium network for transmission of the encrypted and scrambled cell on the network.

21. The apparatus of claim 20, further comprising:

a memory device connected between the output of the first adder and the first input to the second adder wherein the pseudo-random sum pattern is generated offline in software and stored in the memory device and wherein the second adder adds the contents of the memory device to the information cell to form the encrypted and scrambled information cell.

22. The apparatus of claim 20, wherein the shared medium network is a passive optical network.

23. The apparatus of claim 22, wherein the passive optical network has a branch-and-tree topology.

24. The apparatus of claim 22, wherein the passive optical network has a ring topology.

25. The apparatus of claim 22, wherein the passive optical network has a bus topology.

26. The apparatus of claim 20, wherein the information cells have a fixed length.

27. The apparatus of claim 20, wherein the information cells are asynchronous transfer mode cells.

28. The apparatus of claim 20 wherein said apparatus is used in a line termination in a local loop of a telecommunication system.

29. An apparatus for decryption and descrambling of encrypted and scrambled information cells received from a shared medium network comprising:

a descramble pattern generator;

a decryption pattern generator;

a first modulo 2 adder having two inputs and an output, the inputs being connected the descramble pattern generator and the decryption pattern generator; and a second modulo 2 adder having first and second inputs and an output, the first input being connected to the output of the first adder, the second input for receiving the encrypted and scrambled information cells transmitted on the network, and the output providing the descrambled and decrypted original information cell.

30. The apparatus of claim 29, further comprising a memory device connected between the output of the first adder and the first input to the second adder, wherein the first adder provides a decryption and descramble sum pattern to the memory and wherein the second adder adds the contents of the memory device to the recovered encrypted and scrambled information cells.

31. The apparatus of claim 29 wherein said apparatus is used in each one of a plurality of network terminations is a local loop of a telecommunication system.

32. A method for a telecommunication system for the transmission of asynchronous transfer mode cells on a shared medium passive optical network having a line termination connected to a central office, and a plurality of network terminations connected to a like plurality of user premises networks, each network termination having an address and each asynchronous transfer mode cell having address information regarding an intended destination network termination, the method comprising:

generating and transmitting an encrypted and scrambled asynchronous transfer mode cell by performing the steps of:

generating offline a pseudo-random encryption pattern for a corresponding asynchronous transfer mode cell, and a scramble pattern, generating off line a pseudo-random sum pattern by adding modulo 2 the pseudo-random encryption pattern and the scramble pattern, storing the pseudo-random sum pattern in a memory device, generating the encrypted and scrambled asynchronous transfer mode cell by adding modulo 2 the contents of the memory device and the asynchronous transfer mode cell; and transmitting the encrypted and scrambled asynchronous transfer mode cell within an information stream on the passive optical network; and generating decrypted and descrambled asynchronous transfer mode cells from the information stream of the intended destination network termination by performing the steps of:

generating a descramble and decryption sum pattern by modulo 2 addition of a descramble pattern and a decryption pattern;

storing the descramble and decryption sum pattern in a memory device;

sequentially extracting the encrypted and scrambled information cells from the information stream; and generating a processed cell by modulo 2 addition of the contents of the memory device and the extracted encrypted and scrambled cell;

comparing the address information of the asynchronous transfer mode cell and the network termination; and transferring the processed cell to the user premises network if the addresses match, wherein when the addresses match the processed cell is the decrypted and descrambled original asynchronous transfer mode cell.

* * * * *